May 20, 1969 W. B. DUFFY 3,444,774

STUD-AND-FASTENER ASSEMBLY

Filed July 5, 1967

INVENTOR.
WILLIAM B. DUFFY
BY
Charles F. Chisholm
ATTORNEY

United States Patent Office 3,444,774
Patented May 20, 1969

3,444,774
STUD-AND-FASTENER ASSEMBLY
William B. Duffy, Berkeley Heights, N.J., assignor, by mesne assignments, to United-Carr Incorporated, Boston, Mass., a corporation of Delaware
Filed July 5, 1967, Ser. No. 651,281
Int. Cl. F16b 37/00
U.S. Cl. 85—36          9 Claims

ABSTRACT OF THE DISCLOSURE

An initially-threadless stud is provided with a 1-piece sheet-metal fastener which may be pushed and/or turned onto the stud, and which may be removed from the stud by counterrotation. The sheet metal of the fastener is so folded and extended from the fold as to provide diametrically opposite wings, these wings constituting a thumb-and-finger hold for rotation and/or counterrotation of the fastener. In the stud-and-fastener assembly itself, without contact between the fastener and another member through which the stud passes, the fastener has stability on the stud about two transverse axes which are perpendicular to each other and each of which is perpendicular to the axis of the stud. The stability about one of these transverse axes is provided by the inner edges of the wings which closely confront the cylindrical surface of the stud. The stability about the other of these transverse axes is provided by the stud-gripping means of the fastener. Such stud-gripping means consists of an abutment on the fastener which engages the cylindrical surface of the stud and, diametrically opposite the abutment, a spring tooth which engages the cylindrical surface of the stud. The fastener has a washerlike base, which is annularly embossed. This provides a projecting annular rib that is adapted to afford smooth engagement between the fastener and a member confined on the stud by the fastener, or through which the stud passes.

BACKGROUND OF THE INVENTION

(1) Field of the invention

The field of the invention is stud-and-fastener assemblies in which the stud is initially-threadless and the fastener is a sheet-metal nut that is pushed and/or turned onto the stud and is removable from the stud by counterrotation. The word "stud" is used to designate the male member regardless of whether it is integral with another part of the assembly or is a separate member.

(2) The prior art

In my U.S. Pat. 3,212,391 an initially-threadless stud is provided with a 1-piece sheet-metal nut which may be pushed and/or turned onto the stud and which may be removed from the stud by counterrotation. While the stud-and-fastener assembly of that patent is well-suited for various commercial uses, it has shortcomings for other commercial uses. In that patent the fastener has no great stability upon the stud in the absence of clamping contact between the base of the fastener and another member through which the stud passes. Also with the assembly of that patent a wrench is required for removal of the fastener and it is also required for application of the fastener if the base of the fastener is to be brought snugly against another member through which the stud passes.

SUMMARY OF THE INVENTION

For clarity and convenience the assembly and the fastener will be referred to on the basis of the stud being vertical, the fastener advancing downwardly on the stud as the fastener is applied, the portion of the fastener which is toward the top of the stud being the top of the fastener, and the portion of the fastener which is away from the top of the stud being the base of the fastener. However, no limitation as to the positioning of the assembly is to be implied since the stud, and consequently the assembly, may be placed in any oriented position.

The fastener has an interior opening through which the stud passes, whereby the fastener surrounds the stud. The sheet metal of the fastener is folded and extended downwardly from the fold in two-layer wings that project outwardly from the stud in opposite directions and provide a thumb-and-finger hold for rotation and/or counterrotation of the fastener. The two layers of the sheet metal are bent outwardly in opposite directions at the bottom of the wings, the outwardly-bent portions of such layers forming a two-part washerlike base that is disposed perpendicularly to the axis of the stud.

In accordance with one feature of the invention, the two layers of the wings are spaced from each other and each wing has an integral web which ties the two layers together.

In accordance with a further feature of the invention the integral webs which tie the two layers of the wings together are at the outer ends of the wings and are composed of metal drawn downwardly in forming the wings.

In accordance with another feature of the invention, the central longitudinal plane of the wings is disposed diametrically of the stud and the inner vertical edges of the wings closely approach the cylindrical surface of the stud at a level remote from the washerlike base of the fastener, whereby the wings prevent substantial canting of the fastener about a horizontal axis which passes through the stud axis and extends perpendicularly to the central longitudinal plane of the wings.

In accordance with additional features of the invention: The stud is gripped by two members, one on each of the two parts of the washerlike base. One of the stud-gripping members is a spring tooth having a helically-inclined edge which engages the stud and the other of the stud-gripping members is an arcuate abutment which extends upwardly from the washerlike base. The tooth and the abutment are diametrically opposite each other on a diameter perpendicular to the central longitudinal plane of the wings, and the tooth and abutment co-operate to oppose canting of the fastener about a horizontal axis that lies in the central longitudinal plane of the wings.

In accordance with further features of the invention: The washerlike base of the fastener is provided with an annular rib which projects below the general level of the base and is adapted to contact or be contacted by an element that is confined on the stud by the fastener or through which the stud passes. The washerlike base of the fastener is substantially circular and the annular rib is adjacent to the periphery of the washerlike base.

Brief description of the drawing

FIGURE 3 shows in flat form the sheet metal which enters into the fastener.

Figure 1:
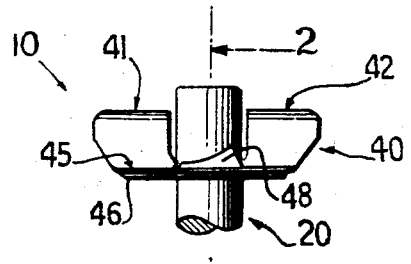
FIGURE 1 shows in elevation an assembly of an initially-threadless stud and a sheet-metal fastener, embodying the invention.

Description of the embodiment that is preferred at the present time

Unless otherwise indicated, the description hereinafter refers to the particular form of the invention that is shown in the drawing; it does not necessarily refer to any other form in which the invention may be embodied. The claims, however, do embrace other forms in which the invention may be embodied. The best form thus far contemplated of carrying out the invention is herein disclosed. Nevertheless the disclosure is by way of illustration and example, since other specific modes are possible, and in some instances it may be feasible to dispense with one or more features or aspects of the invention. In both the description and the claims, parts at times may be identified by specific names for convenience and ready understanding, but such nomenclature is to be understood as having the broadest meaning consistent with the context and with the concept of the invention as distinguished from the pertinent prior art.

Figure 2:
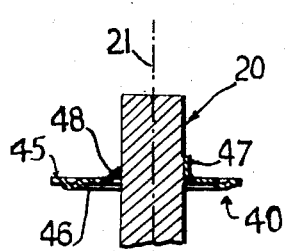
FIGURE 2 is a vertical section of the assembly, taken on the line 2—2 of FIGURE 1.

In FIGURES 1 and 2 the assembly of initially-threadless stud and sheet-metal fastener is designated as a whole by 10. The stud is designated as a whole by 20 and the fastener is designated as a whole by 40. The stud 20, which is considered to stand vertically, is of circular cross-section. The axis 21 of the stud (FIGURE 2) is at the center of the circle of cross section and extends vertically. The fastener 40 has an axis which corresponds with the axis 21 of the stud and, in the assembly of stud and fastener, the axis of the fastener coincides with the axis of the stud.

Figure 3:
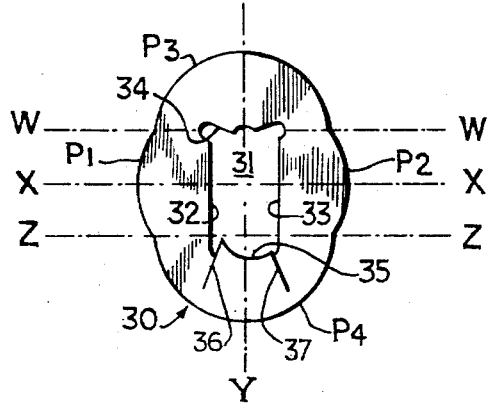
FIGURE 3 is a diagram of the blank for the fastener shown in FIGURES 1 and 2, i.e.

FIGURE 3 diagrams the flat sheet-metal that enters into the fastener 40, the diagrammed flat metal being referred to herein as the "blank." The blank, which is designated as a whole by 30, has major axes X—X and Y—Y which are perpendicular to each other and which intersect at the center of the blank. Parallel to the X—X axis and equidistant therefrom on opposite sides thereof are bend lines W—W and Z—Z.

The periphery of the blank 30, but not the body of the blank, is symmetrical about the X—X axis and also about the Y—Y axis. The portions $P_1$ and $P_2$ of the periphery, which span the space between the bend lines W—W and Z—Z, are circular arcs of equal radius. These arcs are struck about centers which lie on the X—X axis close to the Y—Y axis, the center for each arc being located between the arc and the Y—Y axis. The portions $P_3$ and $P_4$ of the periphery of the blank, which in FIGURE 3 are those portions of the periphery that are respectively above the bend line W—W and below the bend line Z—Z, are circular arcs having the same radius as the arcs $P_1$ and $P_2$. The centers about which the arcs $P_3$ and $P_4$ are struck lie on the Y—Y axis, each center being between the arc and the X—X axis and being at some distance from the X—X axis.

Figure 4:
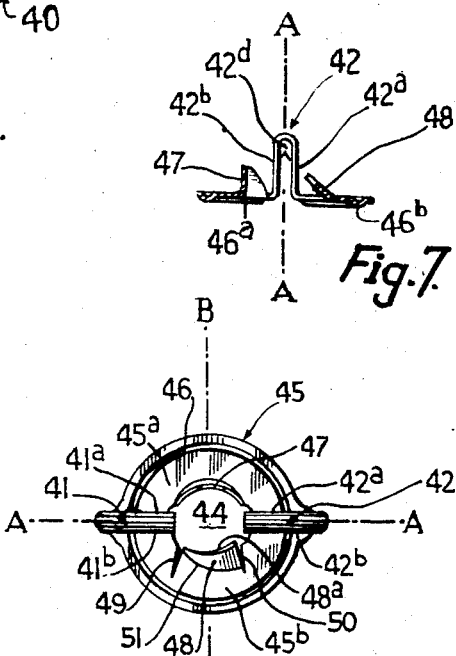
FIGURE 4 is a top plan view of the fastener.

The blank 30 has a central opening 31 which has straight parallel sides 32 and 33 that are perpendicular to the X—X axis and equidistant from the Y—Y axis on opposite sides thereof. The opening 31 has ends 34 and 35 of the shapes shown. The end 34 is symmetrical about the Y—Y axis. The end 35 is substantially bisected by the Y—Y axis, though not symmetrical about the Y—Y axis. The metal adjacent to the irregular end 34 becomes the fastener abutment which engages the cylindrical wall of the stud, and the metal adjacent to the end 35 becomes the spring tooth which is diametrically opposite the abutment and which also engages the cylindrical wall of the stud. In the fastener the spring tooth 48 (FIGURE 4) is defined by slits 49 and 50 which, while not radial, extend outwardly as shown in FIGURE 4. For the purpose of diagramming the blank 30 these slits are diagrammed at 36 and 37, being located symmetrically on opposite sides of the Y—Y axis.

Figure 6:
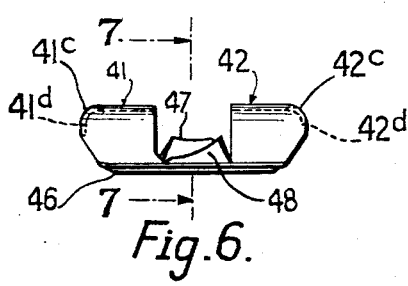
FIGURE 6 is an elevation of the fastener looking from the bottom of FIGURE 4.
Figure 5:
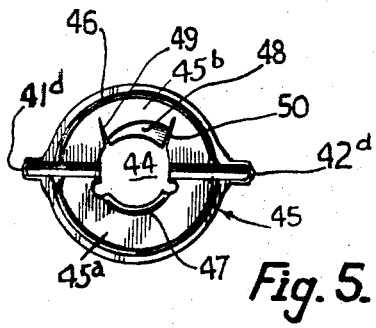
FIGURE 5 is a bottom plan view of the fastener.
Figure 7:
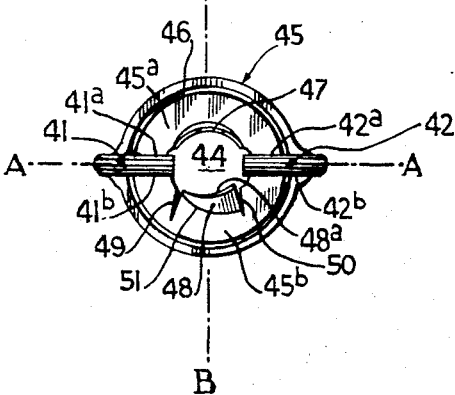
FIGURE 7 is a vertical section of the fastener taken on the line 7—7 of FIGURE 6.

The formed fastener is shown in FIGURES 4–7. In forming the fastener the sheet metal is folded on the X—X axis of the blank 30 and extended downwardly. Additionally, the sheet metal is folded on the W—W and Z—Z axes and extended outwardly. The sheet metal which extends downwardly from the fold on the X—X axis forms two-layer wings 41 and 42 which are vertically-disposed and which project outwardly in opposite directions from the central opening 44 of the fastener as shown in FIGURE 4. In forming the wings 41 and 42 the metal is folded semicircularly as is seen in FIGURE 7, whereby each wing 41 and 42 has two parallel layers of sheet metal that are spaced from each other as shown in FIGURE 7. The two sheet-metal layers of the wing 41 are designated 41a and 41b, and the two sheet-metal layers of the wing 42 are designated 42a and 42b. In the drawing the axis of the fastener is considered to stand vertically; and the central longitudinal plane of the wings 41 and 42 is the vertical plane that is indicated by the line A—A in FIGURES 4 and 7.

In forming the wings 41 and 42 the metal at the outer ends of the wings is drawn downwardly, giving the outer ends of the wings the downwardly-rounded configuration seen in FIGURE 6 at 41c and 42c and also providing the wings with like integral webs 41d and 42d that curve as at 41c and 42c and then extend downwardly. In addition to the dotted-line showing of the webs 41d and 42d in FIGURE 6, the web 42d is seen in elevation in FIGURE 7. Each web is homogeneous with the two layers of its wing and ties the two layers of the wing together.

At the bottom of the wings 41 and 42 the two layers of sheet metal are folded outwardly, about the bend lines W—W and Z—Z respectively in FIGURE 3. The outwardly folded sheet-metal is formed into a two-part washerlike base 45 that is disposed perpendicularly to the central plane A—A of the wings and is also disposed perpendicularly to the axis 21 of the stud (FIGURES 1 and 2). The washerlike base 45 is circular except for outward enlargement adjacent to the layers 41a and 41b of the wing 41 and adjacent to the layers 42a and 42b of the wing 42. The two parts of the washerlike base are individually designated by reference characters 45a and 45b. Close to its periphery the two-part washerlike base 45 is impressed to provide a two-part annular rib 46 that projects below the general level of the base. The two parts of the rib 46 are individually designated as 46a and 46b (FIGURE 7). The rib-parts 46a and 46b extend circularly of the base 45 and, taken together, extend substantially around the base 45 close to the outer edge thereof.

The first part 45a of the washerlike base 45 is provided with abutment 47 which extends upwardly from the fastener base at the edge of the central hole 44. This abutment, which is arcuate as viewed in FIGURE 4, is a stud-engaging member which engages the cylindrical surface of a stud to which the fastener is applied. The bottom of the abutment 47 merges with the base of the fastener throughout a circumferential extent of approximately 115°. From bottom to top the abutment tapers inwardly, having a circumferential extent at its top of about 45°. As is seen in FIGURE 7, the abutment 47 extends upwardly to quite a distance above the washerlike base 45. The abutment is formed from metal which in the blank 30 lies adjacent to the end 34 of the opening 31 in the blank. The arcuate stud-contacting face of the abutment is shaped to give a little clearance between the upwardly-extending edges of the abutment and the cylindrical surface of a stud to which the fastener is applied, such clearance facilitating rotation of the fastener on the stud when there is paint build-up on the stud.

The second part 45b of the washerlike base is also provided with a stud-engaging member but in this instance such member is a spring tooth 48. The tooth 48 is diametrically opposite the abutment 47, both the abutment 47 and the tooth 48 being substantially bisected by the vertical plane B—B which is perpendicular to the central vertical plane A—A of the wings 41 and 42. The line of intersection of the vertical planes B—B and A—A coincides with the fastener axis. Circumferentially the tooth 48 extends from slit 49 to slit 50, these slits being positioned generally symmetrically with respect to the plane B—B and, at the margin of the opening 44, being spaced from each other by a circumferential extent of approximately 100°. The tooth 48 intersects the fastener base along an arcuate line 51, the tooth being struck up from the fastener base and being conically formed. At the vertical plane indicated by the line B—B the tooth is inclined to the fastener base at an angle which is approximately 40° on the inside of the tooth and, therefore, approximately 140° on the outside of the tooth. The tooth 48 is formed with a stud-biting edge 48a which is inclined helically upwardly from the base of the fastener as this edge is transversed counterclockwise in FIGURE 4.

The distance between the spring tooth 48 and the arcuate abutment 47 is somewhat less than the diameter of the stud for which the fastener is intended so that, when the fastener is applied to the stud, there will be adequate interference between the stud and the tooth. When the fastener is applied to the stud the tooth 48 is flexed resiliently outwardly and the stud is gripped between the abutment 47 and the tooth 48.

The arcuate abutment 47 extends for a substantial distance lengthwise of the stud 20 and receives the stud in much the same manner that a V-block receives a round rod. The tooth 48 presses the stud against the arcuate abutment 47, and the result is much the same as when a set screw is used to press a rod against a V-block. Thus in the stud-and-fastener assembly the abutment 47 and the tooth 48 give the fastener marked stability against canting about a horizontal axis lying in the A—A plane, even in the absence of contact between the base 45 of the fastener and another member through which the stud passes.

As is seen in FIGURE 1 the inner vertical-edges of the wings 41 and 42 closely confront the cylindrical surface of the stud 20 throughout the height of the wings 41 and 42; and the wings extend to a considerable distance above the base 45 of the fastener. Thus each of the wings 41 and 42 closely approaches the cylindrical surface of the stud at a level remote from the washerlike base 45, whereby the wings prevent substantial canting of the fastener 40 about a horizontal axis which passes through the stud axis and extends perpendicularly to the plane A—A.

The net result is that the fastener has marked stability against canting about two axes which are perpendicular to each other and each of which is perpendicular to the stud axis. Therefore the fastener has marked stability against canting in any direction. This over-all stability is independent of engagement between the fastener base and a member through which the stud passes. Therefore this stability of the fastener exists when the fastener is used as a mere stop on the stud, without contact between the fastener base and a member through which the stud passes.

The fastener may be pushed and/or turned onto the stud. Where the fastener is to provide an abutment on the stud, without clamping engagement with a member through which the stud passes (not shown), the fastener can be pushed onto the stud without rotation. The edge 48a of the spring tooth 48 bites the stud with only light marking of the surface of the stud. Upon an upward force being applied to the base of the applied fastener the spring tooth 48 responds in toggle fashion and grips the stud more firmly.

In some assemblies the fastener 40 is used to make clamping engagement between the base of the fastener and a member through which the stud passes. In applying the fastener, it may be pushed to substantially final position and then be rotated (clockwise as viewed in FIGURE 4) to bring the base of the fastener snugly against the member that is to be clamped (not shown). Upon the fastener being rotated the helical edge 48a of the spring tooth 48 coacts with the stud to advance the fastener on the stud. Upon counterrotation of the fastener (counterclockwise as viewed in FIGURE 4) the helical edge 48a of the spring tooth coacts with the stud to retract the fastener on the stud, and this affords removal of the fastener if desired.

The spring tooth 48 marks the surface of the stud only lightly and the fastener can be applied to a stud and removed therefrom many times without operatively damaging the surface of the stud. The assembly of the invention is adapted for use in paint rollers such as are used by painters and householders for painting walls and ceilings. The roller-element is journalled on a rodlike shaft, one end of which is free and constitutes the stud 20. The fastener 40 is applied to the free end of the shaft to loosely confine the roller-element on the shaft. The annular rib 46 provides smooth nonchafing engagement between the fastener and the end of the roller-element when the roller-element moves against the base of the fastener. In the assembly of the paint roller by the manufacturer, the fastener 40 is telescoped onto the end of the roller shaft to a predetermined distance which leaves the roller-element loosely confined on the shaft. Using the wings 41 and 42 as a thumb-and-finger hold, the user of the paint roller manually counterrotates the fastener for removal of the fastener and the roller-element as required for cleaning the roller-element after painting. Thereafter the user replaces the roller-element and manually turns the fastener onto the shaft to loosely confine the roller-element on the shaft.

Other uses of the invention are in refrigerator shelf-supports, merchandising racks, advertising displays, and similar assemblies that have rods or heavy wires which pass through a supporting wall or standard or which receive a panel or member that is to be retained by a fastener applied to the free end of a rod or wire which constitutes the stud 20. The fastener 40 may be pushed on and then be rotated to tighten it down. By counterrotation the fastener may be removed. In lieu of pushing the fastener on it may be applied entirely by turning.

The fastener 40 has been made of unhardened spring-steel .015″ thick and then hardened and tempered after forming. The stud 20 may be of mild steel, aluminum, brass, zinc or other malleable metals, also plastics with good tensile strength and toughness. The end of the stud should be free of distortion or burrs. It is recommended that the surface hardness of the stud not exceed Rockwell 30T–78. Nickel, chromium or other hard finishes on the stud are not recommended.

The fastener 40 disclosed is the .25″ size, i.e. for a stud having a nominal diameter of .25″. Commercial rod, wire or other studs whose nominal diameter is .25″ can be expected to vary in actual diameter from .241″ to .252″. For use with commercial rod, wire or other studs having the nominal diameter of .25″ the central opening 44 of the fastener has been made of a size which will circumscribe a circular cylinder having a diameter of from .220″ to .226″; in other words the variation in the effective diameter of the central opening 44 as determined by cylindrical plug gages has been from .220″ to .226″.

For the .25″ size of the fastener the outside diameter of the base 45 along the plane B—B has been made from .650″ to .660″, the over-all thickness of the wings 41 and 42 measured parallel to the plane B—B has been from .080″ to .090″, the over-all dmension of the fastener measured in the A—A plane (i.e. from wing tip to wing tip) has been from .833″ to .853″, the distance between the bottom of the annular rib 46 and the tops of the wings 41 and 42 has been from .222″ to .242″, the distance between the top of the base 45 and the top of the abutment 47 has been approximately .085″, and the distance between the stud-confronting vertical-edges of the wings 41 and 42 has been from .255″ to .270″.

I claim:

1. An assembly of an initially-threadless stud and a sheet-metal fastener pushed and/or rotated onto the stud, the axis of the fastener being coincident with the axis of the stud, the fastener having an interior opening through which the stud passes whereby the fastener surrounds the stud, and the fastener having means which makes holding engagement with the stud and affords removal of the fastener by counterrotation—wherein the improvement comprises:

the sheet metal of the fastener being folded and extending downwardly from the fold in two two-layer wings that project outwardly from the stud in opposite directions and provide a thumb-and-finger hold for counterrotation of the fastener to remove the same from the stud, the two layers of the wings being spaced from each other, and the two layers of the sheet metal being bent outwardly in opposite directions at the bottom of the wings, the outwardly-bent portions of such layers forming a two-part washerlike base that is disposed perpendicularly to the axis of the stud;

a stud-engaging member on the first part of the washerlike base, and a stud-engaging member on the second part of the washerlike base, each of these stud-engaging members being part of the means which makes holding engagement with the stud and affords removal of the fastener by counterrotation.

2. An assembly as in claim 1 wherein the improvement further comprises:

the stud-engaging member that is on the first part of the washerlike base being an arcuate abutment that extends upwardly from the first part of the washerlike base, and the stud-engaging member that is on the second part of the washerlike base being a spring tooth having a helically-inclined edge which engages the stud, the tooth being defined by outwardly-extending slits in the second part of the washerlike base.

3. An assembly as in claim 1 wherein the improvement further comprises:

each wing having a homogeneous web which extends between the two layers and ties the two layers together.

4. An assembly as in claim 3 wherein the improvement further comprises:

the homogeneous webs which tie the two layers of the wings together being at the outer ends of the wings and being composed of metal drawn downwardly in forming the wings.

5. An assembly as in claim 1 wherein the improvement further comprises:

the central longitudinal plane of the wings being disposed diametrically of the stud and each wing having a free edge closely approaching the cylindrical surface of the stud at a level remote from the washerlike base, whereby the wings prevent substantial canting of the fastener about a horizontal axis which passes through the stud axis and extends perpendicularly to the central longitudinal plane of the wings.

6. An assembly as in claim 1 wherein the improvement further comprises:

the central longitudinal plane of the wings being disposed diametrically of the stud and each wing having a free edge closely approaching the cylindrical surface of the stud at a level remote from the washerlike base, whereby the wings prevent substantial canting of the fastener about a horizontal axis which passes through the stud axis and extends perpendicularly to the central longitudinal plane of the wings, the stud-engaging member on the first part of the washerlike base being an arcuate abutment extending upwardly from the first part of the washerlike base, and the stud-engaging member on the second part of the washerlike base being a stud-biting tooth, said tooth and said abutment being diametrically opposite each other on a diameter that is at right angles to the central longitudinal plane of the wings, and said tooth cooperating with said abutment to oppose canting of the fastener about a horizontal axis that lies in the central longitudinal plane of the wings.

7. An assembly as in claim 1 wherein the improvement further comprises:

the washerlike base being provided with an annular rib which projects below the general level of the base and is adapted to contact or be contacted by an element that is confined on the stud by the fastener or through which the stud passes.

8. An assembly as in claim 7 wherein the improvement further comprises:

the washerlike base being substantially circular and the annular rib being adjacent to the periphery of the washerlike base.

9. An assembly as in claim 1 wherein the improvement further comprises:

the central longitudinal plane of the wings being disposed diametrically of the stud and each wing having a free edge closely approaching the cylindrical surface of the stud at a level remote from the washerlike base, whereby the wings prevent substantial canting of the fastener about a horizontal axis which passes through the stud axis and extends perpendicularly to the central longitudinal plane of the wings, the stud-engaging member on the first part of the washerlike base an arcuate abutment extending upwardly from the first part of the washerlike base, and the stud-engaging member on the second part of the washerlike base being a stud-biting tooth, said tooth and said abutment being diametrically opposite each other on a diameter that is at right angles to the central longitudinal plane of the wings, and said tooth co-operating with said abutment to oppose canting of the fastener about a horizontal axis that lies in the central longitudinal plane of the wings, each wing having at its outer end an integral web which ties the two layers together and is composed of metal drawn downwardly in forming the wing, and the washerlike base being substantially circular and having adjacent its periphery an annular rib which projects below the general level of the base and is adapted to be contacted by an element that is confined on the stud by the fastener.

References Cited

UNITED STATES PATENTS

| | | | |
|---|---|---|---|
| 2,260,147 | 10/1941 | Lundberg et al. | 85—36 |
| 2,321,158 | 6/1943 | Rees | 85—36 |
| 2,397,238 | 3/1946 | Rose. | |
| 2,798,406 | 7/1957 | Steck | 85—36 |
| 2,862,413 | 12/1958 | Knohl | 85—36 |
| 2,969,705 | 1/1961 | Becker | 85—36 |
| 3,006,231 | 10/1961 | Kahn. | |

FOREIGN PATENTS

| | | |
|---|---|---|
| 962,511 | 7/1964 | Great Britain. |
| 368,044 | 2/1939 | Italy. |

MARION PARSONS, Jr., *Primary Examiner.*